United States Patent

Sultan et al.

[11] Patent Number: 5,827,960
[45] Date of Patent: Oct. 27, 1998

[54] BI-DIRECTIONAL MASS AIR FLOW SENSOR HAVING MUTUALLY-HEATED SENSOR ELEMENTS

[75] Inventors: Michel Farid Sultan; Charles Robert Harrington, both of Troy; Michael James O'Rourke, Warren; Antonio Buddy Catalan, Sterling Heights, all of Mich.

[73] Assignee: General Motors Corporation, Detroit, Mich.

[21] Appl. No.: 919,644

[22] Filed: Aug. 28, 1997

[51] Int. Cl.$^6$ ...................................................... G01F 1/68
[52] U.S. Cl. ..................................... 73/204.26; 73/204.17
[58] Field of Search ........................... 73/204.11, 204.14, 73/204.17, 204.18, 204.23, 204.25, 204.26

[56] References Cited

U.S. PATENT DOCUMENTS

| | | | |
|---|---|---|---|
| 4,279,147 | 7/1981 | Djorup | 73/189 |
| 4,576,050 | 3/1986 | Lambert | 73/861.05 |
| 4,677,850 | 7/1987 | Miura et al. | 73/204.23 |
| 4,782,708 | 11/1988 | Harrington et al. | 73/861.05 |
| 4,966,037 | 10/1990 | Summer et al. | 73/204.26 |
| 5,243,858 | 9/1993 | Erskine et al. | 73/204.26 |
| 5,263,380 | 11/1993 | Sultan | 73/204.26 |
| 5,515,714 | 5/1996 | Sultan et al. | 73/25.01 |
| 5,520,047 | 5/1996 | Takahashi et al. | 73/204.26 |
| 5,569,851 | 10/1996 | Ichimaru et al. | 73/204.26 |
| 5,629,481 | 5/1997 | Sultan | 73/204.18 |

*Primary Examiner*—Max H. Noori
*Attorney, Agent, or Firm*—Anthony Luke Simon

[57] ABSTRACT

A low cost, bi-directional manifold air flow sensing device based on sensed temperature differential due to airflow achieves improved sensitivity and frequency response by eliminating the heater element of the conventional sensor topology, and operating the sensor elements at a relatively higher current so that each temperature sensing element heats both itself and the other temperature sensing element. The sensitivity is significantly increased due to the increased current in the sensor elements, and the frequency response is significantly increased due to closer spacing of the sensor elements. With this new topology, the sensor elements are said to be mutually heated. In a particularly advantageous mechanization, the sensing device includes two separate pairs of upstream and downstream sensing elements, and the sensing elements are connected in the four legs of a Wheatstone bridge. The sensitivity is doubled since sensor elements are connected in each of the bridge legs, and performance and cost are improved through the elimination of off-chip bridge components. A simple, low cost, temperature compensation circuit compensates for ambient temperature variations.

6 Claims, 3 Drawing Sheets

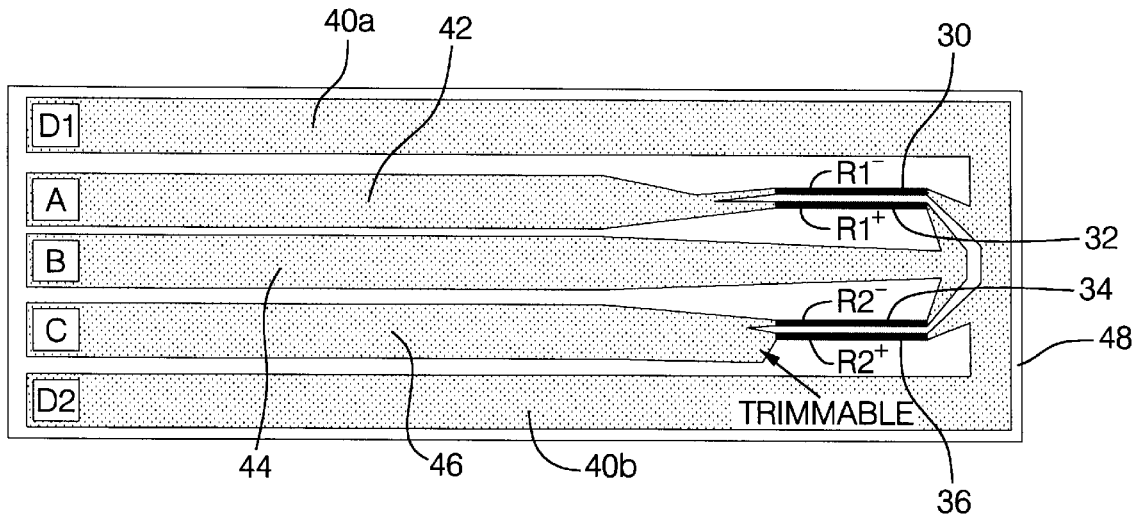
FIG. 3
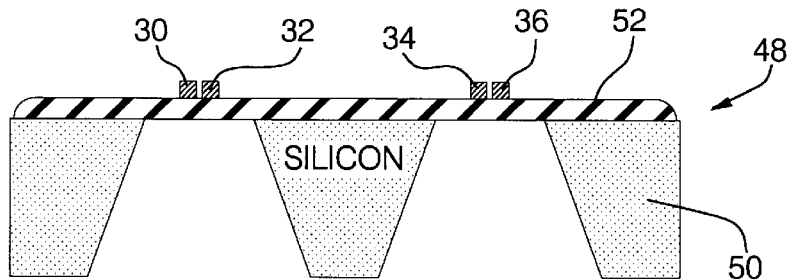
FIG. 4
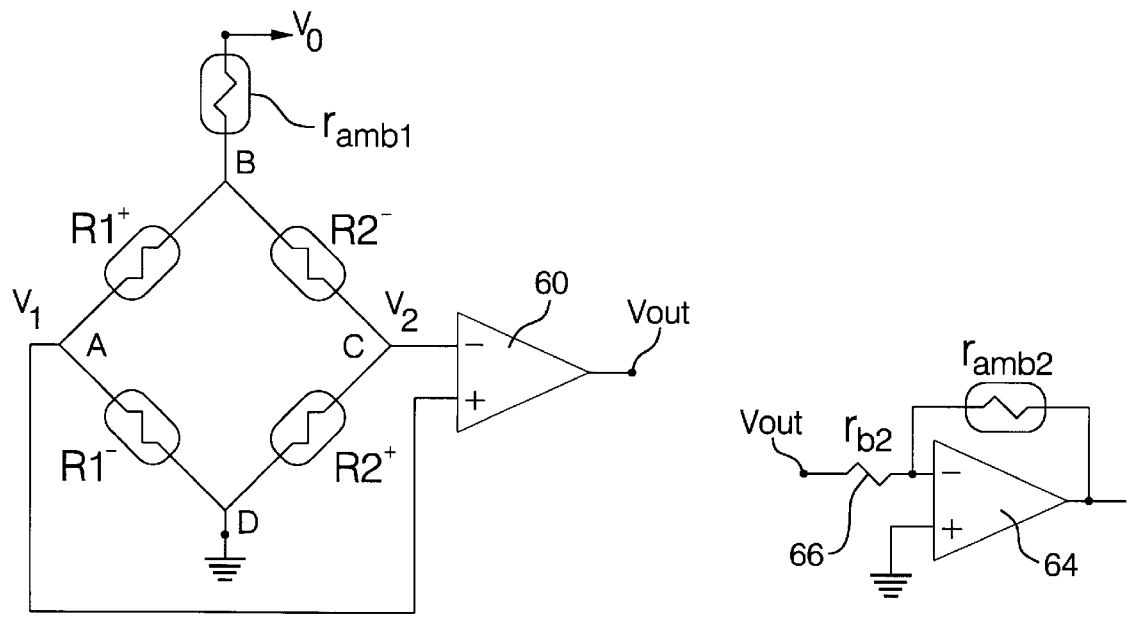
FIG. 5A                    FIG. 5B

BI-DIRECTIONAL MASS AIR FLOW SENSOR HAVING MUTUALLY-HEATED SENSOR ELEMENTS

TECHNICAL FIELD

This invention relates to a bi-directional air flow sensing device having upstream and downstream temperature sensor elements, and more particularly to a sensor configuration in which adjacent elements are mutually heated.

BACKGROUND OF THE INVENTION

Mass air flow information required for precise fueling of an automotive internal combustion engine is commonly obtained with a mass air flow sensor installed upstream from the intake manifold of the engine. In order to avoid error due to momentary flow reversals in the manifold, the sensor is typically required to measure both in-flow and out-flow; that is, the sensor must be bi-directional.

A well known bi-directional sensor topology comprises two temperature sensor elements disposed in-line along the intake air stream, and a heater element disposed between the two sensor elements. Air flow in the manifold is detected as a function of the difference between the temperatures at the two sensor locations. When there is no flow, equal amounts of heat from the heater element reach both sensor elements, and no temperature difference is detected. With an air in-flow or out-flow, one of the sensor elements (the downstream sensor) is heated more than the other sensor (the upstream sensor), resulting in a sensed temperature difference that varies monotonically with air flow. The temperature sensor elements are typically connected in a Wheatstone bridge circuit to convert the sensed temperature difference into a corresponding voltage. Representative sensor configurations of this type are shown and described in the U.S. Pat. Nos. 4,576,050, 5,263,380 and 5,629,481, all of which are assigned to the assignee of the present invention.

While the above-described sensor topology is advantageous in many respects including low cost of manufacture and small package size, it tends to exhibit inherent limitations in sensitivity and frequency response, as alluded to in the aforementioned U.S. Pat. Nos. 5,263,380 and 5,629,481. Sensitivity is inherently limited due to the relatively low bridge currents which are specified to ensure that the temperature sensor elements operate in a passive mode. The frequency response, or bandwidth, is inherently limited due to the physical separation of the elements. While these limitations can be compensated to a certain extent with active filters, the additional circuitry adds significantly to the cost of the sensor. What is desired is a new sensing device that retains the packaging and low cost advantages of the above-described sensor topology while overcoming these performance limitations.

SUMMARY OF THE PRESENT INVENTION

The present invention is directed to an improved, low cost, bi-directional manifold air flow sensing device based on sensed temperature differential in the manifold airflow, and having improved sensitivity and frequency response compared to previously known sensing devices.

According to the invention, a sensing device having improved sensitivity and frequency response is achieved by eliminating the heater element of the above-described sensor topology, and operating the sensor elements at a relatively higher current so that each temperature sensing element heats both itself and the other temperature sensing element. The sensitivity is significantly increased due to the increased current in the sensor elements, and the frequency response is significantly increased due to closer spacing of the sensor elements. With this new topology, the sensor elements may be said to be mutually heated.

In a particularly advantageous mechanization of this invention, the sensing device includes two separate pairs of upstream and downstream sensing elements, and the sensing elements are connected in the four legs of a Wheatstone bridge. The sensitivity is doubled since sensor elements are connected in each of the bridge legs, and performance and cost are improved through the elimination of off-chip bridge components.

Additionally, the present invention comprehends a simple, low cost, temperature compensation circuit involving in a first respect signal amplification with temperature dependent gain, and in a second respect, temperature dependent regulation of the bridge voltage.

BRIEF DESCRIPTION OF THE DRAWINGS

FIG. 3 depicts an alternate sensor topology according to this invention.

FIG. 4 depicts an advantageous mechanization of the sensor device of this invention.

FIGS. 5A–5B depict bridge drive circuits according to this invention.

DETAILED DESCRIPTION OF THE DRAWINGS

Figure 1A:
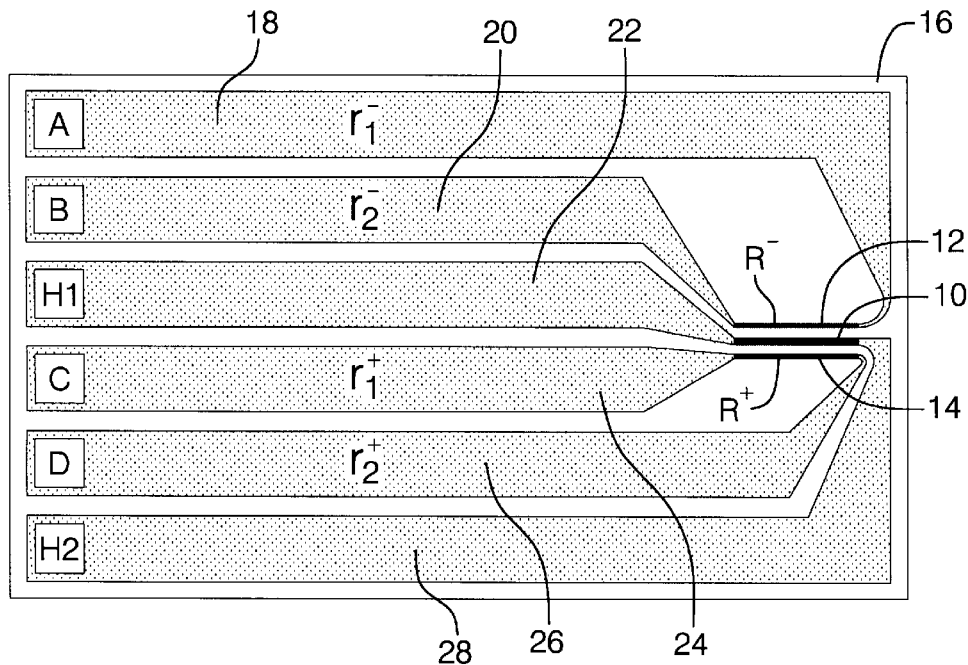
FIGS. 1A–1C depict a prior art mass air flow sensing device.
Figure 1B:
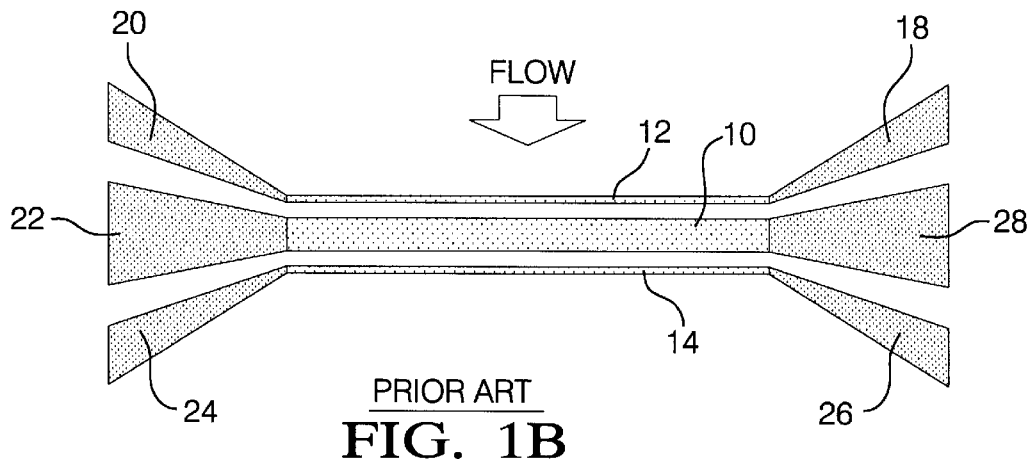
Figure 1C:
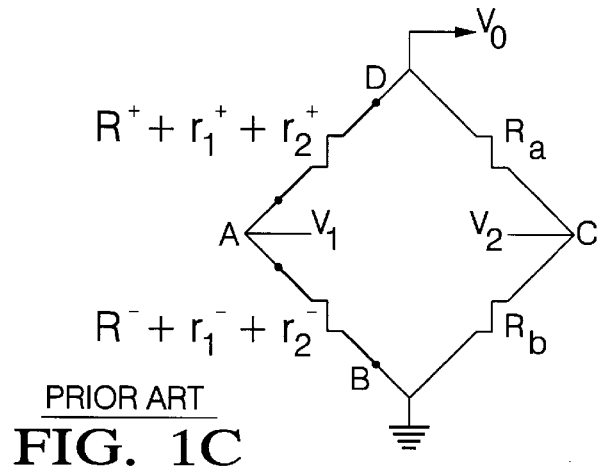

A prior art sensor topology of the type referred to above is illustrated in FIGS. 1A–1C. The sensor, depicted in FIG. 1A, comprises a heating element 10 and two temperature sensor elements 12 and 14 formed on a substrate 16. The substrate 16 may be a silicon wafer, coated with a thermal insulating material such as polyimide, silicon dioxide, silicon nitride or oxy-nitride to limit heat conduction through the substrate. The heating and sensor elements 10–14 are typically formed of platinum, and an array of generally parallel conductive traces 18–28 couple the elements 10–14 to a series of bond pads designated by the letters A, B C, D, H1 and H2. As seen in FIG. 1A, the heating element 10 is accessed by the bond pads H1-H2, the sensor element 12 by the bond pads A-B, and the sensor element 14 by the bond pads C-D.

The sensor elements 12 and 14 are essentially temperature sensitive resistors, and are additionally designated in FIGS. 1A–1C as having nominal resistances $R^-$ and $R^+$, respectively. To minimize parasitic resistance, the conductive traces 18–28 sometimes incorporate a gold metalization layer. Residual parasitic resistance in the sensor element traces 18, 20, 24 and 26 are designated as $r_1^-$, $r_2^-$, $r_1^+$ and $r_2^+$ respectively.

As specifically shown in FIG. 1B, the manifold air flow is assumed to be in the downward direction as viewed in the figures. According to this convention, sensor element 12 is considered as the upstream sensor, while sensor element 14 is considered as the downstream sensor, with the understanding that such designations reverse when the direction of air flow reverses.

The sensor is designed so that, as much as possible, heating of the sensor elements 12 and 14 is attributable solely to the heater element 10. Thus, the sensor elements 12 and 14 are designed to operate at very low current levels to minimize self heating. With no air flow in the manifold, equal amounts of heat from the heater element 10 reach both sensors, resulting in no detectable temperature difference at the two elements. With air flow in the manifold, more heat is carried to the downstream sensor than to the upstream sensor, increasing the downstream resistance $R^+$ and decreasing the upstream resistance $R^-$. This results in a sensed temperature difference, the sign of which indicates the direction of air flow, and the magnitude of which indicates the air flow magnitude. The temperature difference is converted to a voltage difference by configuring the sensors 12 and 14 as two legs of a Wheatstone bridge, as shown in FIG. 1C. The other branch of the bridge comprises a pair of precision resistors designated as $R_a$ and $R_b$. Including parasitic resistance, the upstream sensor leg of the bridge is the sum of $R^+$, $r_1^+$ and $r_2^+$, and the downstream sensor leg of the bridge is the sum of $R^-$, $r_1^-$ and $r_2^-$. A known voltage $V_0$ is applied to terminals D and B of the bridge, and the bridge resistors $R_a$ and $R_b$ are trimmed so that the output voltages $V_1$ and $V_2$ are equal when there is no manifold air flow. With manifold air flow, neglecting parasitic resistance, the voltage difference $V_2-V_1$ may be given by the expression:

$$V_2-V_1=V_0(\Delta R/2R_0) \qquad (1)$$

where $\Delta R$ is the incremental or decremental change in resistance (assumed equal) of the downstream and upstream sensors, and $R_0$ is upstream or downstream resistance (assumed equal) with no manifold air flow. The incremental resistance $\Delta R$ increases as the air flow increases, typically with a logarithmic type of dependence, producing a proportionately increasing voltage difference. The voltage difference $V_2-V_1$ is typically sensed with a differential amplifier, and significant amplification is required due to the low signal voltages.

As indicated above, the above-described sensor topology is inherently limited in frequency response and sensitivity due to the required physical separation of the sensor elements, and the relatively low bridge currents which are specified to ensure that the sensor elements operate in a passive mode. While these limitations can be compensated to a certain extent with amplification and active filtering, the additional circuitry adds significantly to the cost of the sensor.

The sensing device of the present invention minimizes the inherent limitations of the above-described sensing device by eliminating the heater element 10 and operating the upstream and downstream sensor elements at a relatively higher current so that each temperature sensing element heats both itself and the other temperature sensing element. In other words, the upstream sensor element heats both itself and the downstream sensor element, and the downstream sensor element heats both itself and the upstream sensor element. In a preferred mechanization, the sensing device includes two thermally isolated pairs of upstream and downstream sensing elements, and the sensing elements are connected in the four legs of a Wheatstone bridge. The preferred mechanization, depicted in FIGS. 2A–2C, includes a first pair of upstream and downstream sensor elements comprising the elements 30 and 32, and a second pair of upstream and downstream sensor elements comprising the elements 34 and 36, all mounted on the substrate 48. The resistances of the upstream and downstream sensor elements 30 and 32 in the first pair are designated as $R1^-$ and $R1^+$, while the resistances of the upstream and downstream sensor elements 34 and 36 in the second pair are designated as $R2^-$ and $R2^+$. Conductive traces 40, 42, 44 and 46 couple the elements 30–36 to bond pads designated as D, A, B and C, respectively. As with the sensing device of FIGS. 1A–1C, the elements 30–36 are formed of platinum, and the substrate 48 may be a wafer of silicon coated with polyimide, silicon dioxide, silicon nitride or oxy-nitride, or any combination of such materials, as explained in more detail below in reference to FIG. 4.

Figure 2A:
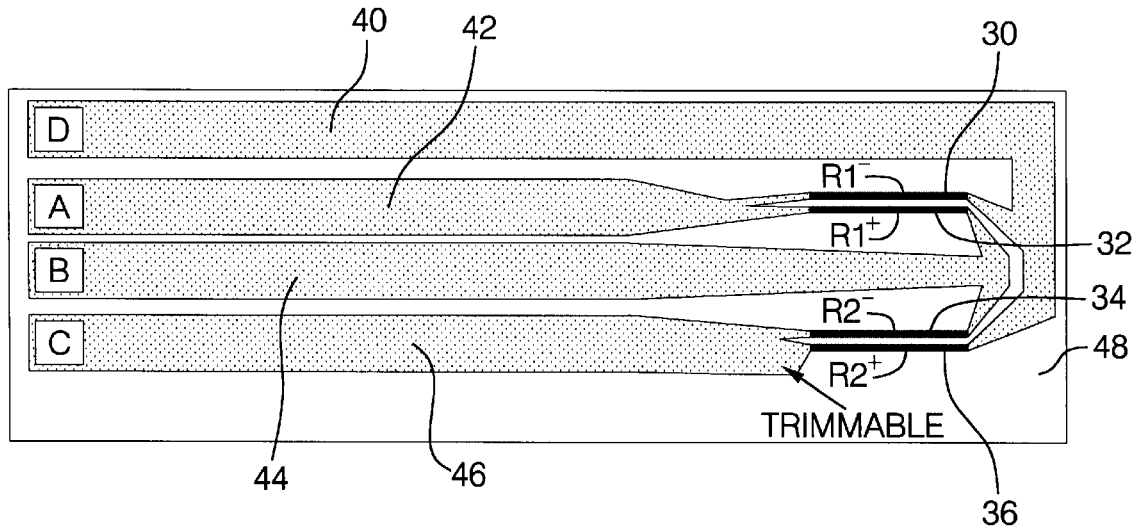
FIGS. 2A–2C depict a mass air flow sensing device according to this invention.
Figure 2B:
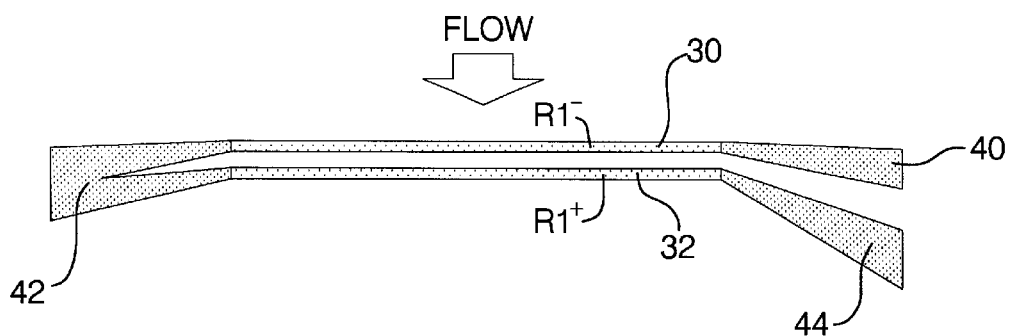

As seen most clearly in the expanded view of FIG. 2B, the sensor topology of the present invention allows the sensor elements of a given pair to be spaced much more closely than in the prior art sensor topologies. The closer spacing not only facilitates the mutual heating of the sensor elements; it also significantly increases the frequency response or bandwidth of the sensing device. For similar substrate characteristics, the bandwidth increases and response time becomes faster as the spacing between the heat generation and temperature sensing elements is reduced. In the prior art sensor topology, the center-to-center spacing is largely dictated by the width of the heater element 10 and the gap between the heater element 10 and a respective sensor element 12 or 14. In a practical prior art mechanization having a center-to-center spacing of approximately 50 microns, the resulting bandwidth is approximately 125 Hz. However, with the mutually heated sensor topology of the present invention, the central heating element is eliminated, and the center-to-center spacing can be reduced to approximately 30 microns, resulting in a doubling of the bandwidth to approximately 250 Hz.

Figure 2C:
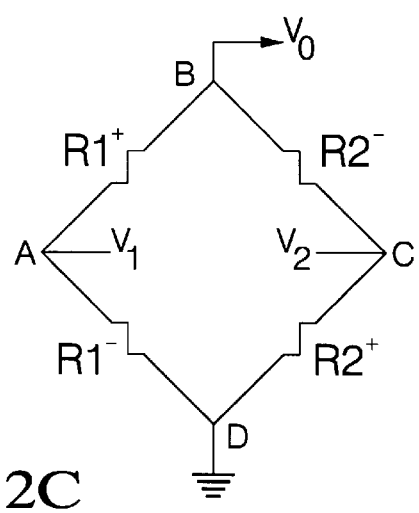

In the preferred two-pair configuration of FIG. 2A, the sensor elements 30–36 are connected in the four legs of a Wheatstone bridge, as shown in FIG. 2C. A known voltage $V_0$ is applied to terminals D and B of the bridge, and one or more of the conductive traces 40–46 are trimmed (with a laser, for example) as indicated in FIG. 2A so that the output voltages $V_1$ and $V_2$ at nodes A and C are equal when there is no manifold air flow.

Despite the doubling of sensor elements, the illustrated bridge configuration allows the number of conductive traces to be reduced to four. The trace 40 corresponding to bridge terminal D is coupled to sensor elements 30 and 36; the trace 42 corresponding to bridge terminal A is coupled to sensor elements 30 and 32; the trace 44 corresponding to bridge terminal B is coupled to sensor elements 32 and 34; and the trace 46 corresponding to bridge terminal C is coupled to sensor elements 34 and 36. This feature, along with the elimination of heater elements, contributes to a significantly smaller package size, compared to prior art sensor topologies. Additionally, the reliability of the sensor device is improved since fewer sensor wire bonds are required.

With manifold air flow, neglecting parasitic resistance, the voltage difference $V_2-V_1$ of the bridge shown FIG. 2C may be given by the expression:

$$V_2-V_1=V_0(\Delta R/R_0) \qquad (2)$$

where $\Delta R$ is the incremental or decremental change in resistance (assumed equal) of the downstream and upstream sensors, and $R_0$ is upstream or downstream resistance (assumed equal) with no manifold air flow. As compared to expression (1), it will be seen that the two pair configuration effectively doubles the sensitivity of the sensing device. In other words, a given incremental resistance change $\Delta R$ will produce a voltage difference $V_2-V_1$ twice as large as the prior art sensor topology. The sensitivity is further increased, as mentioned above, because the voltage change across any given sensor element is proportional to the current through the element, which is significantly increased according to this invention to provide the mutual heating effect. In practice, it has been shown that these factors combine to triple or better the signal level in each bridge leg compared to prior art sensor topologies, for a given chip power consumption and sensor element geometry.

With the above-described configuration, it will be seen that no external precision resistors are required, and that any trimming for balancing can be done on-chip, and at the wafer level, thereby eliminating a costly calibration step during air meter assembly. Additional related advantages are that the four legs of the bridge have nearly identical temperature coefficient of resistance (TCR) characteristics, providing increased accuracy, and that the bridge is entirely on-chip, providing increased immunity to electro-magnetic interference (EMI). A further advantage is that terminals A and C of the Wheatstone bridge are now on-chip and close to the sensor elements, reducing the need for a gold metalization layer on the conductive traces 40–46.

FIG. 3 illustrates an alternative sensor configuration in which the conductive trace 40 is divided into two parallel traces, designated 40a and 40b. This configuration, while increasing the number of traces and the overall size of the device compared to the configuration of FIG. 2A, improves the symmetry of the sensor device, which potentially provides more balanced heating effects and improved accuracy. The bond terminal D1 and D2 are inter-connected, and the bridge configuration is the same as described above in reference to FIG. 2C.

FIG. 4 depicts a mechanization of the sensor device of this invention in which the substrate 48 comprises a silicon wafer 50 coated with a thermally insulating membrane 52 of polyimide, silicon dioxide, silicon nitride or oxy-nitride. The sensor elements 30–36 are formed on the membrane 52, and portions of the silicon wafer 50 opposite the pairs of elements 30/32, 34/36 are notched by etching or micromachining, leaving the sensor elements 30–36 under-laid solely by the membrane 52. This not only enhances the thermal isolation between the pairs of sensor elements, but it also reduces the power and time required for the sensing device to reach a stable operating temperature at power up.

FIG. 5A depicts a drive circuit for the Wheatstone bridge of FIG. 2C. The differential amplifier 60 is connected to the bridge nodes A and C, and produces an output voltage $V_{out}$ according to the difference $V_2-V_1$, as described above. Compensation for variations in ambient temperature can be achieved by placing an ambient temperature sensitive resistor $r_{amb1}$ in the bridge circuit as shown to provide an ambient temperature dependent voltage supply for the bridge. Alternatively, as shown in FIG. 5B, temperature dependence may be achieved with a temperature dependent amplifier. In this case, the output voltage $V_{out}$ is supplied to an operational amplifier 64 via resistor $r_{b2}$, with the temperature sensitive resistor $r_{amb2}$ connected as the feedback resistor, providing a gain of $r_{amb2}(T)/r_{b2}$, where T is the sensed ambient temperature.

In summary, the present invention provides a novel sensor topology that offers many advantages over known prior art sensor topologies. In its basic form, this invention comprehends a single pair of sensor elements connected in a bridge substantially as shown in FIG. 1C. As explained above, this simple configuration provides increased sensitivity and bandwidth, smaller packaging, increased reliability and lower cost compared with prior art sensor topologies. The preferred embodiment of the invention comprising two pairs of sensor elements connected in the four legs of Wheatstone bridge provides further improved sensitivity, increased accuracy, reduced cost, improved susceptibility to EMI, and easier calibration. Additionally, it should be recognized that the illustrated embodiments are not exhaustive in nature, and that various modifications will occur to those skilled in the art. For example, the mass air flow sensing device of this invention is not limited to use with an internal combustion engine, and can be used in any application in which it is desired to measure the mass air flow through a manifold or duct. In this regard, it will be understood that sensor devices incorporating this and other modifications may fall within the scope of this invention, which is defined by the appended claims.

The embodiments of the invention in which an exclusive property or privilege is claimed are defined as follows:

1. A bi-directional mass air flow sensing device for measuring air flow, comprising:
   a bridge circuit coupled across a voltage potential, wherein the bridge circuit comprises
   (a) a first leg including first and second temperature dependent sensor elements connected in series at a first series connection and disposed on a thermally insulative substrate in line with an air flow and in proximity to each other so that, relative to a first direction of the air flow, the first sensor element is upstream of the second sensor element and so that heat developed by passage of current through said first sensor element heats both said first sensor element and said second sensor element, and heat developed by passage of current through said second sensor element heats both said second sensor element and said first sensor element, and
   (b) a second leg connected in parallel with the first leg and including third and fourth temperature dependent sensor elements connected in series at a second series connection and disposed on the thermally insulative substrate in line with the air flow and in proximity to each other so that, relative to the first direction of the air flow, the third sensor element is upstream of the fourth sensor element and so that heat developed by passage of current through said third sensor element heats both said third sensor element and said fourth sensor element, and heat developed by passage of current through said fourth sensor element heats both said fourth sensor element and said third sensor element, wherein the third and fourth sensor elements are substantially thermally isolated from the first and second sensor elements, wherein the first sensor element is on a high side of the first series connection relative to the voltage potential and the third sensor element is on a low side of the second series connection relative to the voltage potential; and
   a differential amplifier having an inverting input and a non-inverting input, wherein one of the inverting and non-inverting inputs is coupled to the first series connection and the other of the inverting and non-inverting inputs is coupled to the second series connection, wherein the differential amplifier develops an output signal indicative of the air flow based on differences in temperatures at said first and second sensor elements and at said third and fourth sensor elements.

2. A bi-directional mass air flow sensing device for measuring air flow, comprising:
   a bridge circuit coupled across a voltage potential, wherein the bridge circuit comprises
   (a) a first leg including first and second temperature dependent sensor elements connected in series at a first series connection and disposed on a thermally insulative substrate in line with an air flow and in proximity to each other so that, relative to a first direction of the air flow, the first sensor element is upstream of the second sensor element and so that heat developed by passage of current through said first sensor element heats both said first sensor element and said second sensor element, and heat developed by passage of current through said second sensor element heats both said second sensor element and said first sensor element, and (b) a second leg connected in parallel with the first leg and including third and fourth temperature dependent sensor elements connected in series at a second series connection and disposed on the thermally insulative substrate in line with the air flow and in proximity to each other so that, relative to the first direction of the air flow, the third sensor element is upstream of the fourth sensor element and so that heat developed by passage of current through said third sensor element heats both said third sensor element and said fourth sensor element, and heat developed by passage of current through said fourth sensor element heats both said fourth sensor element and said third sensor element, wherein the third and fourth sensor elements are substantially thermally isolated from the first and second sensor elements, wherein the first sensor element is on a high side of the first series connection relative to the voltage potential and the third sensor element is on a low side of the second series connection relative to the voltage potential; and an amplifier circuit having two inputs, wherein one of the inputs is coupled to the first series connection and the other of the inputs is coupled to the second series connection, wherein the amplifier circuit develops an output signal indicative of the air flow based on differences in temperatures at said first and second sensor elements and at said third and fourth sensor elements.

3. The bi-directional mass air flow sensing device of claim 1, also comprising an air temperature sensitive resistor coupled between a source of said voltage potential and said bridge circuit so as to compensate said output signal for variations in air temperature.

4. The bi-directional mass air flow sensing device of claim 1, also comprising an amplifier for applying an air temperature dependent gain to said output signal, thereby to compensate said output signal for variations in air temperature.

5. A bidirectional mass air flow sensing device for measuring a gas flow, comprising:

a bridge circuit coupled across a voltage potential, wherein the bridge circuit comprises (a) a first leg including a first pair of mutually heated temperature dependent sensor elements connected in series at a first series connection and arranged so that one sensor element of the first pair is upstream of the other sensor element of the first pair relative to a primary direction the gas flow, and (b) a second leg connected in parallel with the first leg and including a second pair of mutually heated temperature dependent sensor elements connected in series at a second series connection and arranged so that one sensor element of the second pair is upstream of the other sensor element of the second pair relative to the primary direction of the gas flow, wherein, relative to the voltage potential, the upstream sensor element of the first pair is on a high side of the first series connection and the upstream sensor element of the second pair is on a low side of the second series connection; and an amplifier having two inputs, wherein one of the inputs is coupled to the first series connection and the other of the inputs is coupled to the second series connection, wherein the amplifier develops an output signal indicative of the gas flow.

6. A bi-directional mass air flow sensing device according to claim 1, wherein the output signal indicates whether the air flow is in the first direction or in a second direction opposite the first direction.

* * * * *